United States Patent
Li et al.

(10) Patent No.: US 9,166,832 B1
(45) Date of Patent: Oct. 20, 2015

(54) METHODS AND APPARATUS FOR DECISION FEEDBACK EQUALIZATION ADAPTATION

(71) Applicant: ALTERA CORPORATION, San Jose, CA (US)

(72) Inventors: Wei Li, Fremont, CA (US); Weiqi Ding, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/046,597

(22) Filed: Oct. 4, 2013

(51) Int. Cl.
H04L 25/03 (2006.01)

(52) U.S. Cl.
CPC ..... *H04L 25/03057* (2013.01); *H04L 25/03885* (2013.01); *H04L 2025/0349* (2013.01); *H04L 2025/03579* (2013.01); *H04L 2025/03611* (2013.01)

(58) Field of Classification Search
CPC ................. H04L 25/03057; H04L 2025/0349; H04L 2025/03503; H04L 7/0062; H04L 2025/03624; H04L 2025/03681; H04L 25/03267; H04L 25/03146; H04L 2025/03687; H04L 25/03006; H04L 2025/03579; H04L 25/03885; H04L 2025/03611; H04B 10/6971; H04B 1/0475; H04B 2201/709709
USPC ......... 375/233, 348, 350, 232, 229, 230, 346; 455/296, 501
See application file for complete search history.

(56) References Cited

U.S. PATENT DOCUMENTS

| | | | | |
|---|---|---|---|---|
| 4,773,034 A | * | 9/1988 | Debus, Jr. ..................... | 708/323 |
| 6,373,889 B1 | * | 4/2002 | Alelyunas et al. ............ | 375/233 |
| 6,438,163 B1 | * | 8/2002 | Raghavan et al. ............ | 375/233 |
| 6,791,995 B1 | * | 9/2004 | Azenkot et al. ............... | 370/436 |
| 6,922,436 B1 | * | 7/2005 | Porat et al. .................... | 375/222 |
| 8,098,588 B1 | | 1/2012 | Berndt et al. | |
| 8,391,350 B2 | | 3/2013 | Chan et al. | |
| 2008/0304559 A1 | * | 12/2008 | Wu et al. ....................... | 375/233 |
| 2009/0016422 A1 | * | 1/2009 | Zhong et al. .................. | 375/233 |
| 2013/0142245 A1 | * | 6/2013 | Sindalovsky et al. ......... | 375/233 |

* cited by examiner

*Primary Examiner* — Leila Malek
(74) *Attorney, Agent, or Firm* — Okamoto & Benedicto LLP

(57) ABSTRACT

A receiver circuit includes a feedback filter having multiple taps for receiving a quantized signal and outputting a feedback signal and adaptation circuitry for adapting tap weights of the feedback filter. In one embodiment, the tap weights may be adapted with variable update resolution. In another embodiment, the feedback filter may have fixed and floating taps. Other embodiments relate to methods of equalizing an input signal using a feedback filter. In one embodiment, tap weights of the feedback filter are adapted using adaptation circuitry with variable update resolution. In another embodiment, the adaptation circuitry adapts fixed and floating tap weights of the feedback filter. Other embodiments and features are also disclosed.

11 Claims, 12 Drawing Sheets

METHODS AND APPARATUS FOR DECISION FEEDBACK EQUALIZATION ADAPTATION

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

SUMMARY

A receiver circuit includes a linear equalizer for receiving an input data signal and outputting a linearly-equalized signal, a slicer circuit for receiving the linearly-equalized signal and outputting a quantized signal, a feedback filter having multiple taps for receiving the quantized signal and outputting a feedback signal, a summation node for adding the feedback signal to the linearly-equalized signal, and adaptation circuitry for adapting tap weights of the feedback filter. In one embodiment, the tap weights may be adapted with variable update resolution. In another embodiment, the feedback filter may have fixed and floating taps.

Other embodiments relate to methods of equalizing an input signal using a feedback filter. In one embodiment, tap weights of the feedback filter are adapted using adaptation circuitry with variable update resolution. In another embodiment, the adaptation circuitry adapts fixed and floating tap weights of the feedback filter.

Other embodiments and features are also disclosed.

DETAILED DESCRIPTION

The present disclosure provides innovative apparatus and methods for decision feedback equalization (DFE) adaptation. These apparatus and methods are described as follows.

In accordance with an embodiment of the invention, a modified zero-forcing least-mean-square (ZF LFS) procedure for tap weight updates is provided for improving both a signal-to-interference ratio (SIR) and a signal-to-interference and noise ratio (SINR). The modified ZF LFS procedure uses coarse and fine resolutions to adapt DFE tap weights.

In accordance with an embodiment of the invention, programmable convergence detection criteria may be used to switch from coarse and fine resolution step sizes for the DFE adaptation. The convergence detection criteria may be programmed so as to optimize convergence time and reduce quantization noise (improve jitter performance).

In accordance with another embodiment of the invention, a variable-bandwidth updating scheme may be used. The variable-bandwidth updating may be used to further reduce quantization noise.

In accordance with another embodiment of the invention, a floating tap sweeping procedure may be used. The floating tap sweeping procedure may be used to reduce channel reflection. Furthermore, a floating tap convergence detection procedure may be used. The floating tap convergence detection may be used to distinguish reflection from noise to ensure the accurate acquisition of the reflection position.

Figure 1:
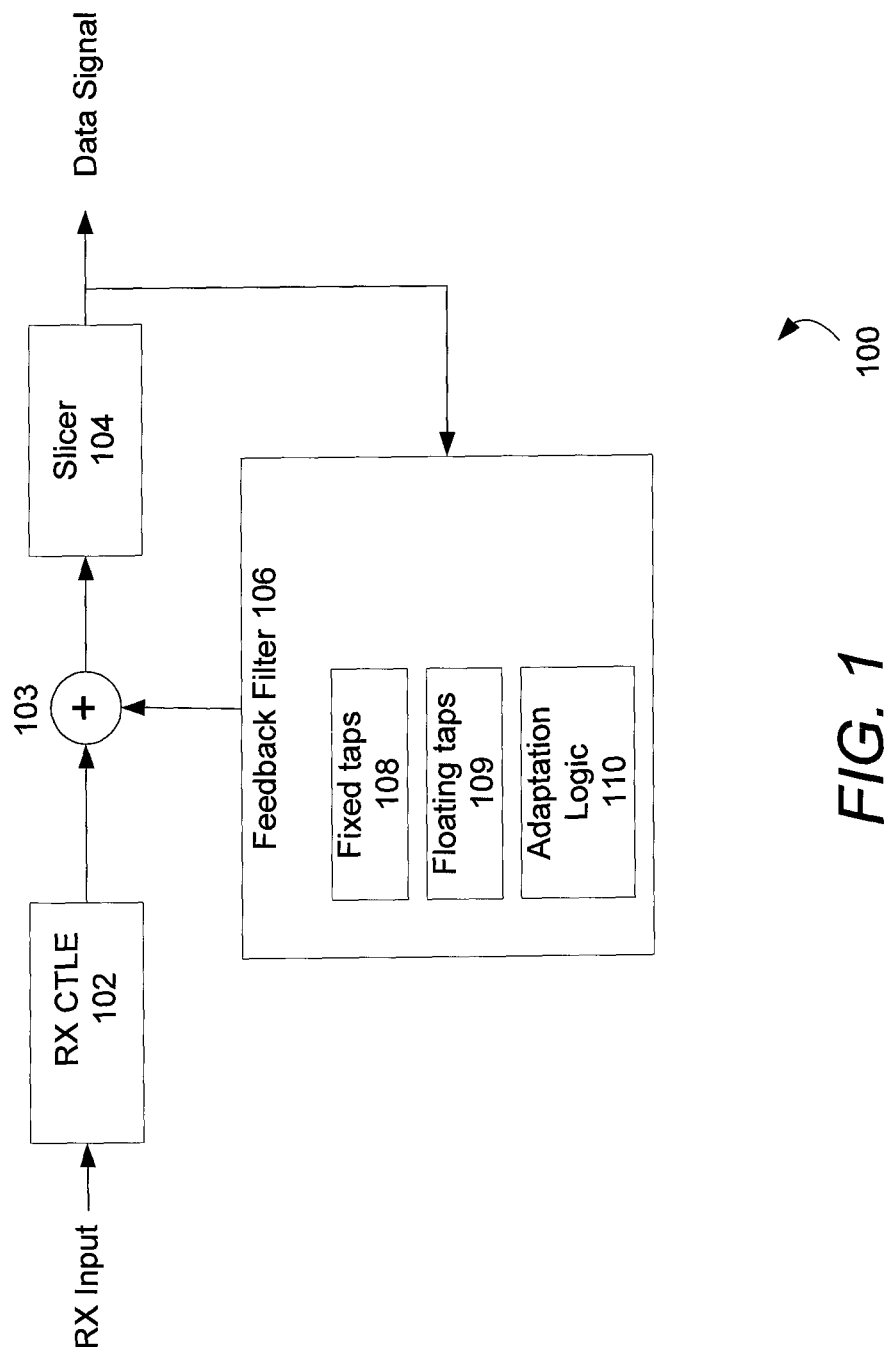
FIG. 1 depicts a receiver circuit for a high-speed serial data link in accordance with an embodiment of the invention.

FIG. 1 depicts a receiver circuit 100 for a high-speed serial data link in accordance with an embodiment of the invention. The receiver 100 includes a receiver continuous-time linear equalization (RX CTLE) circuit 102, a slicer (decision) circuit 104, and a feedback filter circuit 106. As shown, the feedback filter circuit 106 may include fixed taps 108, floating taps 109 and adaptation logic 110.

A received data signal (RX Input) is input to the RX CTLE 102. The output of the feedback filter 106 is added at summation node 103 to the output of the RX CTLE 102, and the resultant signal is provided to the data slicer 104. The slicer 104 quantizes the signal and outputs a data signal. The data signal is fed back to the feedback filter 106 for the decision feedback equalization.

Figure 2:
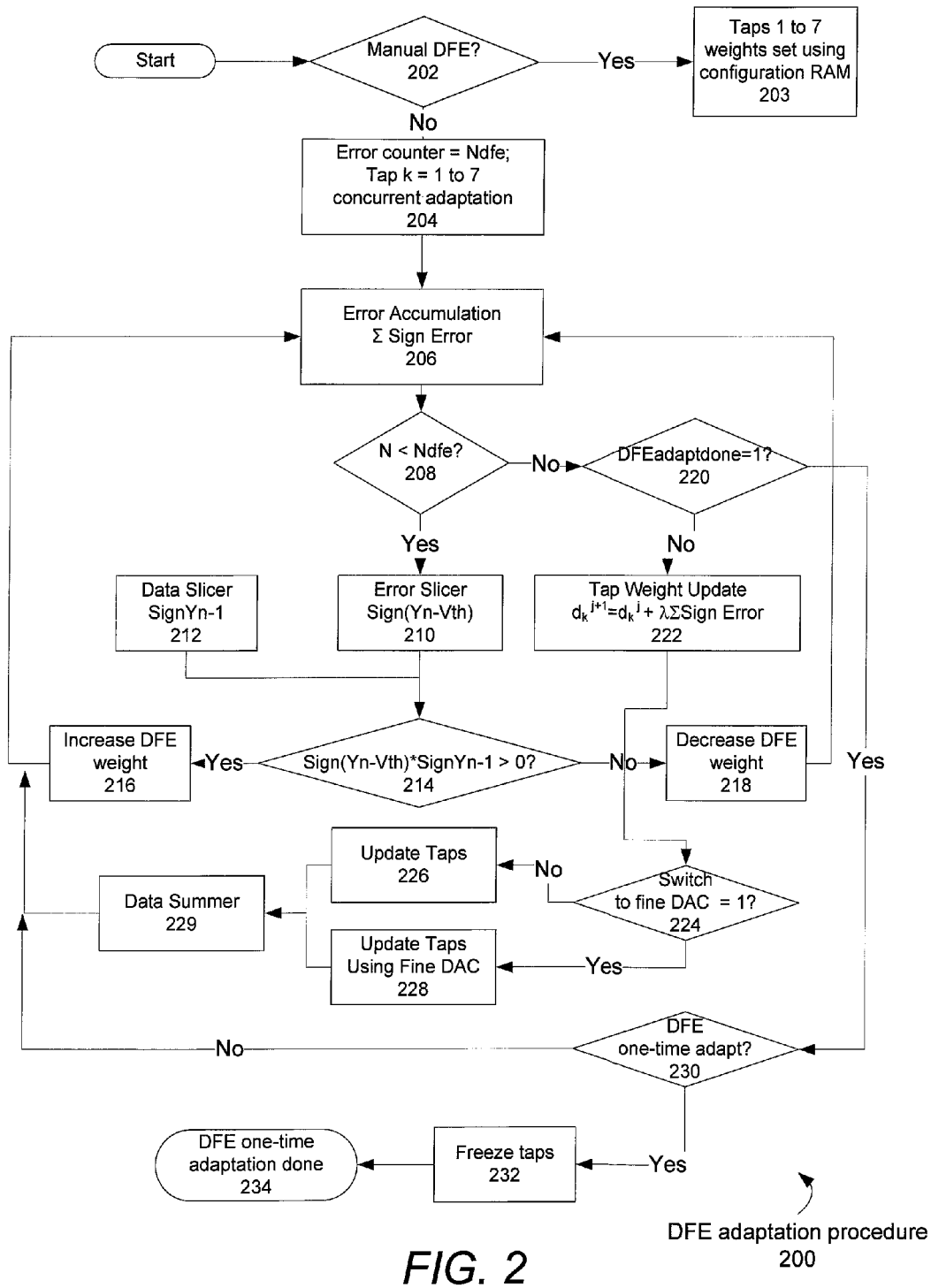
FIG. 2 is a flow chart of a method for DFE adaptation in accordance with an embodiment of the invention.

FIG. 2 is a flow chart of a method 200 for DFE adaptation in accordance with an embodiment of the invention. The method 200 includes a zero-forcing least-mean-square (ZF LFS) procedure that is modified to use coarse and fine resolutions to adapt DFE tap weights.

Per step 202, an initial determination may be made as to whether the DFE taps are to be set manually. This determination may be done by checking a configuration bit, for example. If so, then a plurality of fixed taps (for example, taps 1 to 7) may be set per step 203 based on values in configuration RAM. Otherwise, the procedure 200 may move forward to step 204 and used the modified ZF LMS procedure to set the tap values.

Per step 204, an error counter Ndfe may be initialized. The adaptation may then be performed concurrently for multiple fixed taps in the feedback filter.

Per step 206, error accumulation may be performed. The error accumulation may involve a summation of the signs of detected errors ($\Sigma$ Sign Error). Per step 208, after a predetermined period of accumulation, a determination may be made as to whether the DFE update counter N is less than the error counter Ndfe.

If the DFE update counter N is less than the error counter Ndfe in step 208, then an error slicer may be applied to the difference Yn−Vth per step 210 to generate a sign signal Sign(Yn−Vth), where Yn is the data slicer output for the $n^{th}$ data, and Vth is the data amplitude reference or threshold voltage which is used to check the data amplitude. In addition, per step 212, the SignYn−1 signal may be obtained, where Yn−1 is the data slicer output for the $(n-1)^{th}$ data. Per step 214, these two sign values are multiplied, and a determination may be made as to whether the product is greater than zero. If Sign(Yn−Vth)*SignYn−1>0, then the DFE weight is increased per block 216; otherwise, the DFE weight is decreased per block 218. Thereafter, the method 200 loops back to step 206 where further error accumulation is performed.

On the other hand, if the DFE update counter N is larger than the error counter Ndfe in step 208, then a check is made as to whether the DFEadaptdone flag is set per step 220. If the DFEadaptdone flag is not set (i.e. if DFEadaptdone=0), then the DFE adaptation is not yet done, and the method 200 performs a tap weight update procedure per step 222. The tap weight update procedure may be performed according to the following equation: $d_k^{j+1}=d_k^j+\lambda\Sigma$Sign Error, where $d_k^{j+1}$ is the weight of the $k^{th}$ tap at time j+1, $d_k^j$ is the weight of the $k^{th}$ tap at time j, is the tap incremental step, and $\Sigma$Sign Error is the accumulated sign error from step 206. Thereafter, per step 224, a determination may be made as to whether the Switch-to-fine-DAC flag has been set. If the Switch-to-fine-DAC flag is not set (i.e. if Switch-to-fine-DAC=0), then a coarse step mode is in effect so the taps are updated using the coarse DAC (digital-to-analog coverter) in step 226. Otherwise, if the Switch-to-fine-DAC flag is set (Switch-to-fine-DAC=1), then a fine step mode is in effect so the taps are updated using the fine DAC in step 228. After the taps are updated (in either step 226 or step 228), the method 200 continues to the data summer in step 229 and then loops back to step 206 where further error accumulation is performed.

Referring back to step 220, if the DFEadaptdone flag is set (i.e. if DFEadaptdone=1), then the DFE adaptation is done and the method 200 moves forward and determines whether the DFE adaptation is a one-time adaptation in step 230. If the just completed DFE adaptation is not a one-time adaptation, then the method 200 loops back to step 206 where further error accumulation is performed. Otherwise, if the just completed DFE adaptation is a one-time adaptation, then the weights of the taps may be frozen per step 232, and the one-time adaptation may be deemed complete per step 234.

Figure 3:
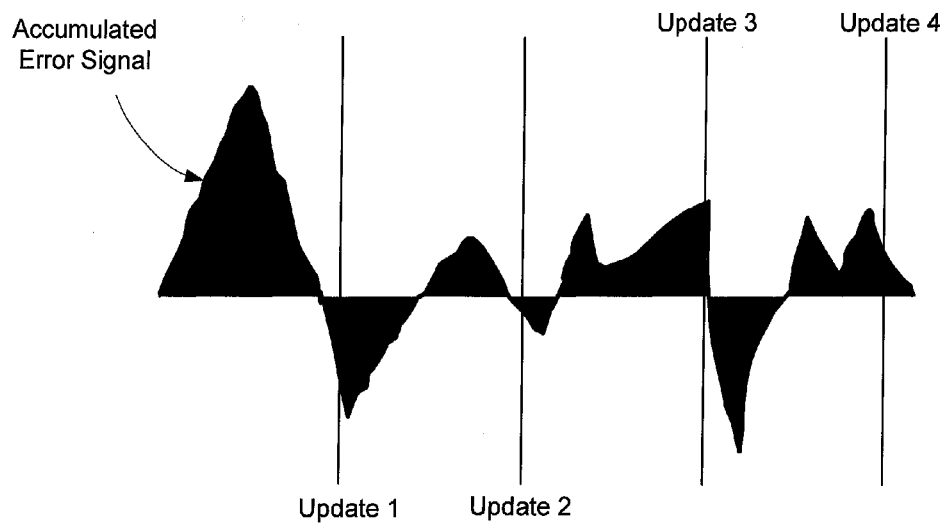
FIG. 3 is a diagram depicting tap weight updates in a fixed bandwidth mode in accordance with an embodiment of the invention.

FIG. 3 is a diagram depicting tap weight updates in a fixed bandwidth mode in accordance with an embodiment of the invention. In this fixed bandwidth mode of operation, the tap weights are updated after accumulation of a fixed number (for example, a number N) of error signals. In other words, the updates are performed at even intervals in the fixed bandwidth mode. The accumulated error signal may be a summation of sign errors.

As depicted, after a first interval of error accumulation, a first update (Update 1) is performed. Update 1 involves a decrease in tap weights because the accumulated error is negative at the end of the first interval. After a second interval of error accumulation, a second update (Update 2) is performed. Update 2 involves a decrease in tap weights because the accumulated error is negative at the end of the second interval. After a third interval of error accumulation, a third update (Update 3) is performed. Update 3 involves an increase in tap weights because the accumulated error is positive at the end of the third interval. Finally, after a fourth interval of error accumulation, a fourth update (Update 4) is performed. Update 4 involves an increase in tap weights because the accumulated error is positive at the end of the fourth interval.

Figure 4:
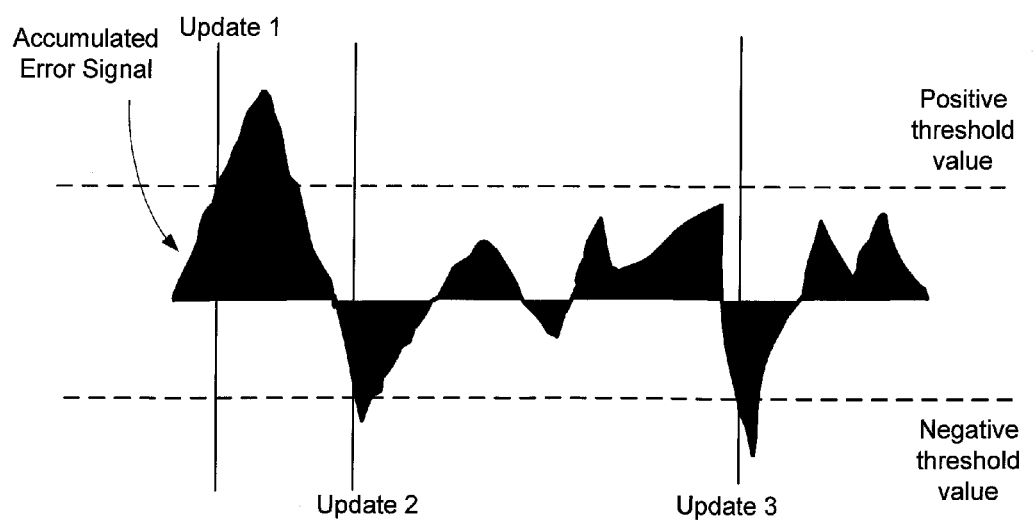
FIG. 4 is a diagram depicting tap weight updates in a variable bandwidth mode in accordance with an embodiment of the invention.

FIG. 4 is a diagram depicting tap weight updates in a variable bandwidth mode in accordance with an embodiment of the invention. In this variable bandwidth mode of operation, the tap weights are updated once a magnitude of the accumulated error signal increases from below a threshold value to above the threshold value. The accumulated error signal may be a summation of sign errors. In one implementation, two counters may be used to count the positive and negative error signals.

As depicted, after the accumulated error signal makes a first transition that is from below the positive threshold to above the positive threshold, a first update (Update 1) is performed. Update 1 involves an increase in tap weights because the accumulated error is positive at the threshold crossing. After the accumulated error signal makes a second transition that is from above the negative threshold to below the negative threshold, a second update (Update 2) is performed. Update 2 involves a decrease in tap weights because the accumulated error is negative at the threshold crossing. Finally, after the accumulated error signal makes a third transition that is from above the negative threshold to below the negative threshold, a third update (Update 3) is performed.

Advantageously, the variable bandwidth methodology described above may be used to reduce quantization noise. The reduction of quantization noise reduces jitter at the receiver.

Figure 5:
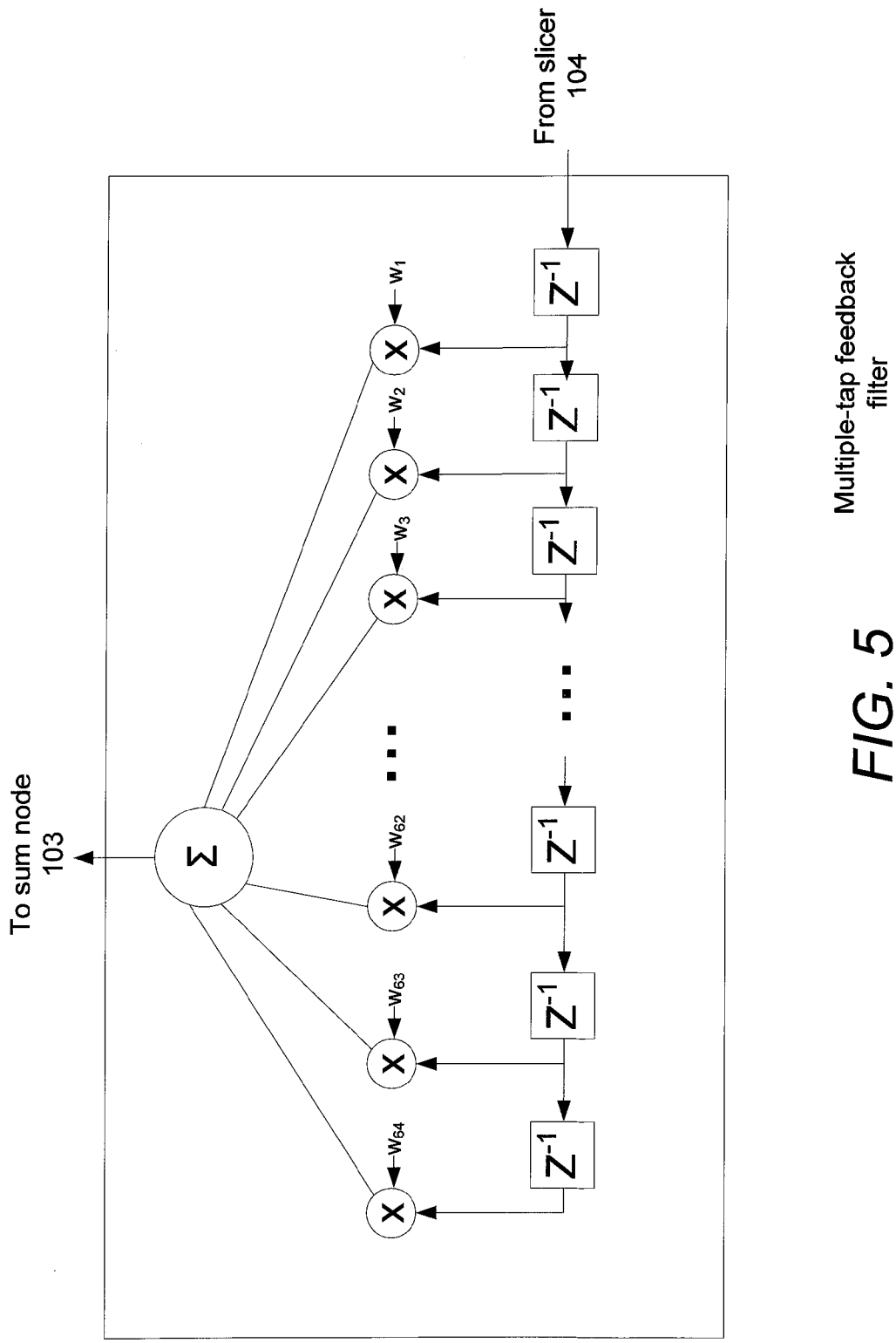
FIG. 5 is a diagram of a multiple-tap feedback filter in accordance with an embodiment of the invention.

FIG. 5 is a diagram of a multiple-tap feedback filter in accordance with an embodiment of the invention. As illustrated, the data signal fed back from the slicer 104 may be input into a 64-stage tapped delay line of an exemplary filter structure. Each $Z^{-1}$ delay is a unit delay. In this example, there are 64 tap weights $w_1$ through $w_{64}$, and the combined signal from the node is output to the sum node 103.

Figure 6:
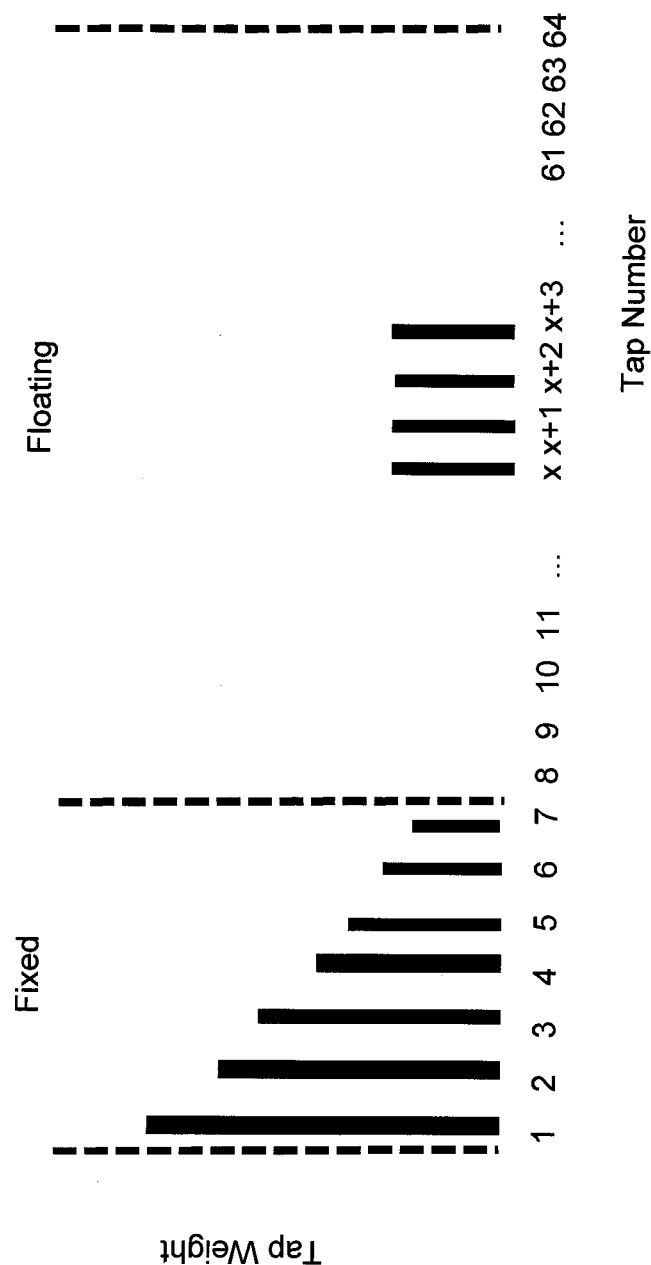
FIG. 6 is a diagram of fixed and floating taps for a feedback filter in accordance with an embodiment of the invention.

FIG. 6 is a diagram of fixed and floating taps for a feedback filter in accordance with an embodiment of the invention. In this exemplary implementation, the feedback filter includes 64 taps, where the first seven taps (tap number 1 through 7) are fixed, and there are four floating taps (tap numbers x, x+1, x+2 and x+3, where x may vary from 8 through 61).

The four floating taps may move together as their location is varied (i.e. as x is varied). The floating tap sweep may start with the floating taps at taps 8 through 11 (i.e. x=8) and be incremented one tap number at a time (i.e. x may be incremented by one each time) such that the sweep ends with the floating taps at taps 61 through 64.

A DFE tap weight convergence procedure may be applied and allowed to converge at each position (i.e. at each x) during the tap sweep. Once the floating taps are converged at that position, the following two values may be determined. A first value is the maximum tap weight among the four floating taps, and a second value is the sum of the four floating tap weights. The highest maximum tap weight of previous positions is stored in memory, along with the position corresponding to the highest maximum tap weight. Similarly, the sum of four floating tap weights of previous positions is stored in memory, along with the position corresponding to the highest maximum tap weight.

At each position (i.e. at each x) during the sweep of tap positions, the maximum tap weight of the current position may be compared with the memory-stored value of the highest maximum tap weight. If the maximum tap weight of the current position is greater, then it replaces the highest maximum tap weight, and the current position replaces the memory-stored values of the corresponding position. On the other hand, if the previously-stored highest maximum tap weight is greater, then no replacements are made. Thus, the highest maximum tap weight value and the corresponding position is tracked stored in memory during the sweep.

In addition, at each position (i.e. at each x) during the sweep of tap positions, the sum of floating tap weights of the current position may be compared with the memory-stored value of the highest sum of floating tap weights. If the sum of floating tap weights of the current position is greater, then it replaces the highest sum of floating tap weights, and the current position replaces the memory-stored values of the corresponding position. On the other hand, if the previously-stored highest sum of floating tap weights is greater, then no replacements are made. Thus, the highest sum of floating tap weights and the corresponding position is tracked and stored in memory during the sweep.

In accordance with an embodiment of the invention, the receiver may be configured to use one of multiple criteria for selecting a final position for the floating taps. For example, as described above, one criterion for the selecting the final position may be to select the position with the highest maximum tap weight, and another criterion may be to select the position with the highest sum of floating tap weights.

Figure 7A:
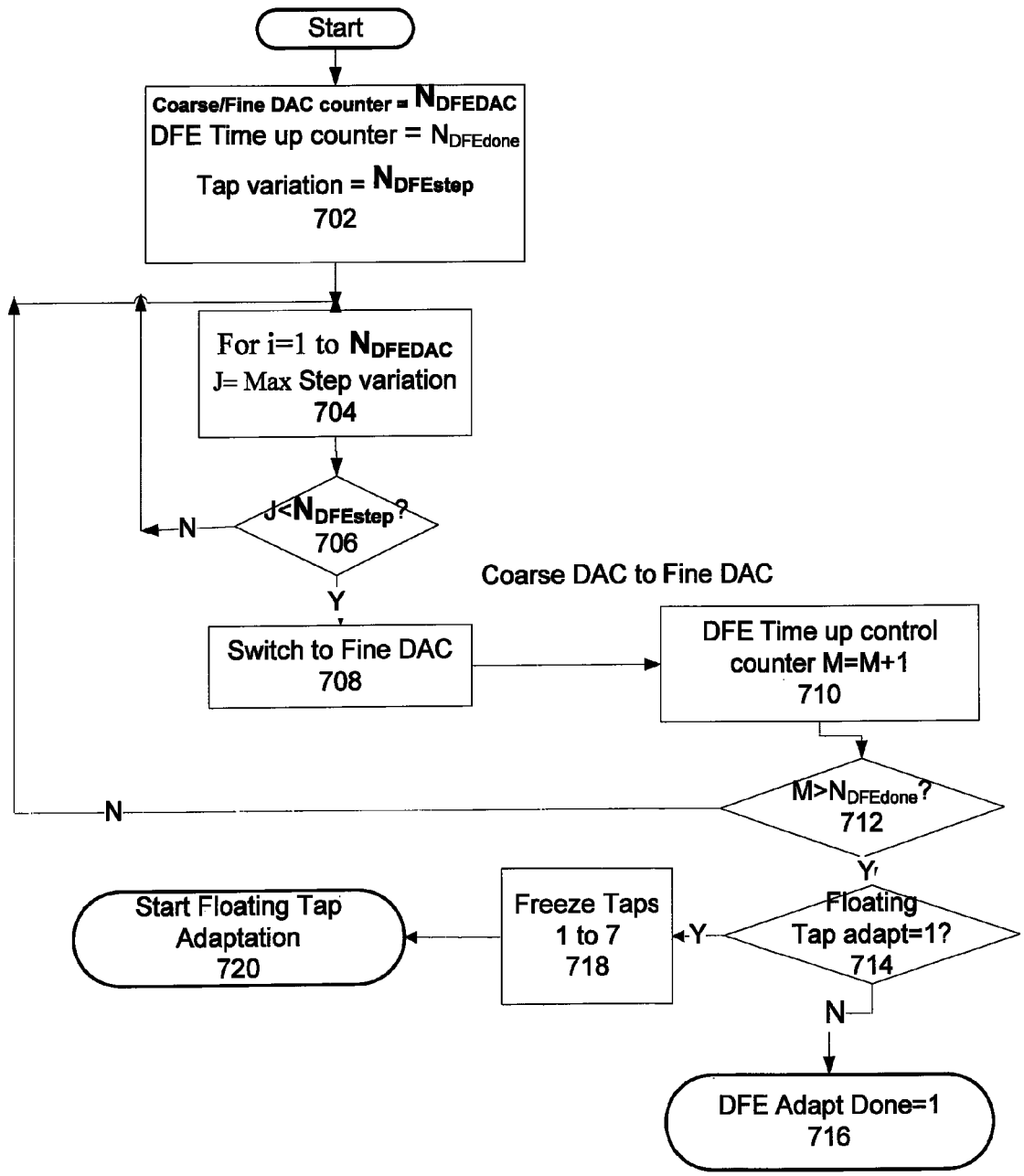
FIG. 7A is a flow chart of a procedure for detecting DFE adaptation convergence in accordance with an embodiment of the invention.

FIG. 7A is a flow chart of a procedure 700 for detecting DFE adaptation convergence in accordance with an embodiment of the invention. Per step 702, counters and variables may be initialized. These may include a coarse/fine DAC counter $N_{DFEDAC}$, a DFE time-up counter $N_{DFEdone}$, and a tap variation variable $N_{DFEstep}$.

Per step 704, an instruction loop may be performed. In the instruction loop, a variable i may go from 1 to $N_{DFEDAC}$, and the variable J may be set to the maximum step variation.

Per step 706, a determination may be made as to whether J is less than the tap variation variable $N_{DFEstep}$. If J is not less than $N_{DFEstep}$, then the procedure 700 may loop back to step 704. On the other hand, if J is less than $N_{DFEstep}$, then the procedure 700 switches from use of a coarse DAC to use of a fine DAC per block 708.

After switching to the fine DAC, then the DFE time-up control counter M may be incremented by one per block 710. Thereafter, a determination may be made as to whether M is greater than $N_{DFEdone}$. If M is not greater than $N_{DFEdone}$, then the procedure 700 may continue by looping back to step 704. On the other hand, if M is greater than $N_{DFEdone}$, then a further determination may be made as to whether or not a floating tap adaptation (Floating Tap adapt) flag is set per step 714.

If the floating tap adaptation flag is not set, then the DFE Adapt Done flag may be set to one per step 716. If the floating tap adaptation flag is set, then the fixed taps (for example, taps 1 through 7, in one implementation) may be frozen at their current values per step 718, and the floating tap adaptation may be started per step 720.

Figure 7B:
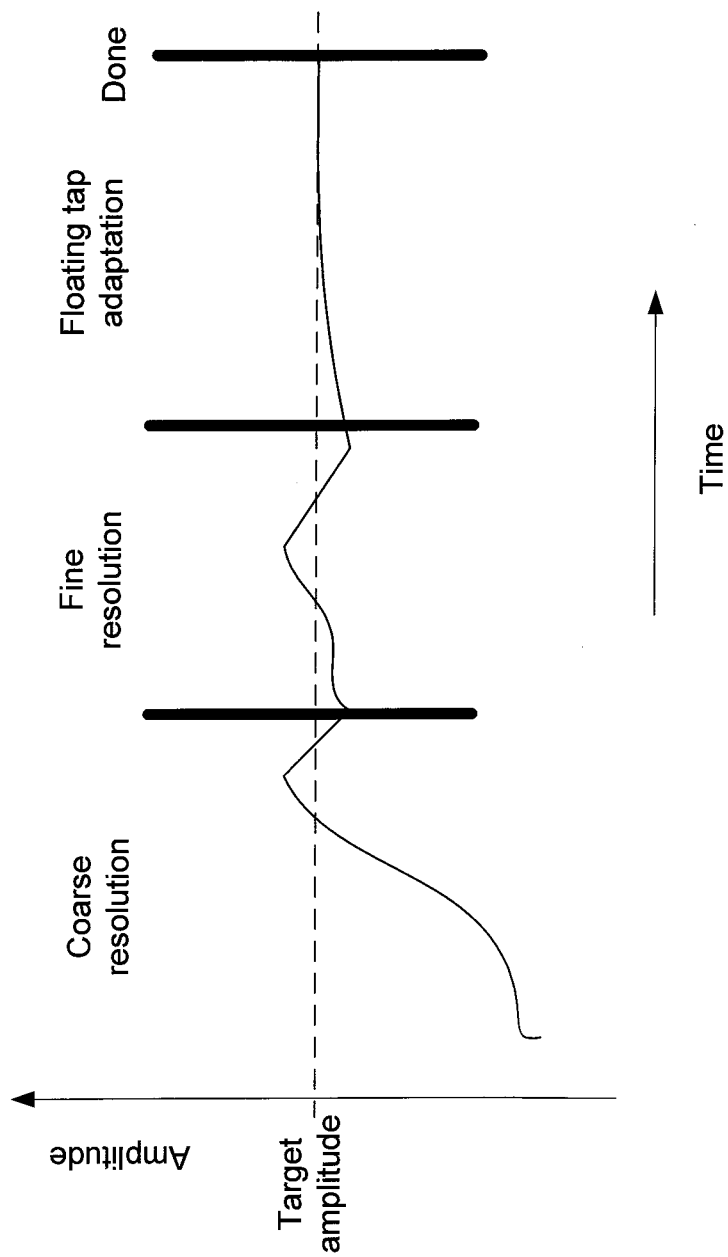
FIG. 7B is a graph illustrating amplitude convergence during coarse resolution and fine resolution modes in accordance with an embodiment of the invention.

FIG. 7B is a graph illustrating amplitude convergence during coarse resolution and fine resolution modes in accordance with an embodiment of the invention. As shown, the coarse-resolution adaptation mode for adapting the fixed taps switches to the fine-resolution adaptation mode. If the floating tap adaptation flag is set, then the floating tap adaptation mode may start once the fine-resolution adaptation is done.

Figure 8B:
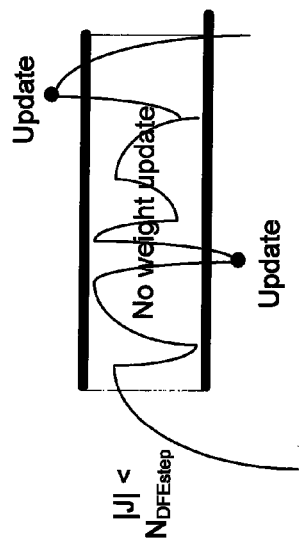
FIG. 8B is a diagram illustrating DFE weight updates not taking place when the error signal difference is below a threshold value in accordance with an embodiment of the invention.
Figure 8A:
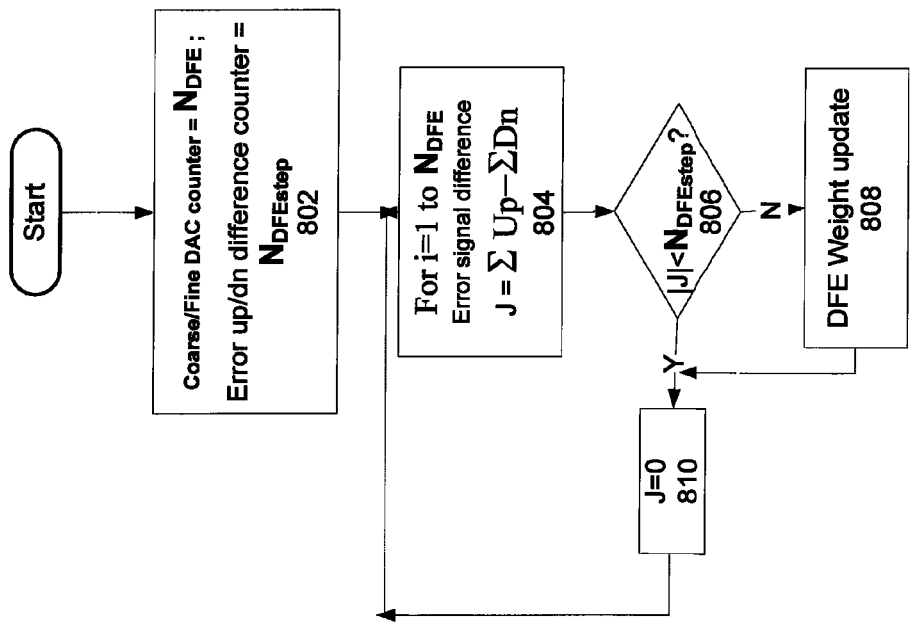
FIG. 8A is a flow chart of a method of variable-bandwidth DFE adaptation in accordance with an embodiment of the invention.

FIG. 8A is a flow chart of a method 800 of variable-bandwidth DFE adaptation in accordance with an embodiment of the invention. Per step 802, counters and variables may be initialized. These may include a coarse/fine DAC counter $N_{DFE}$ and an error up/down difference counter $N_{DFEstep}$.

Per step 804, an instruction loop may be performed. In the instruction loop, a variable i may go from 1 to $N_{DFE}$, and the variable J may be used to track the error signal difference. The error signal difference may be the summation of up signals minus the summation of down signals.

Per step 806, a determination may be made as to whether the magnitude of J is less than $N_{DFEstep}$. If the magnitude of J is less than $N_{DFEstep}$, then J may be reset to zero per step 810, and the method 800 may continue by going back to step 804. Otherwise, if the magnitude of J is not less than (i.e. is greater than or equal to) $N_{DFEstep}$, then the DFE weight may be updated per step 808. Thereafter, J may be reset to zero per step 810, and the method 800 may continue by going back to step 804.

FIG. 8B is a diagram illustrating DFE weight updates not taking place when the error signal difference is below a threshold value in accordance with an embodiment of the invention. As shown, the updates occur only when the magnitude of J is greater than $N_{DFEstep}$.

Figure 9:
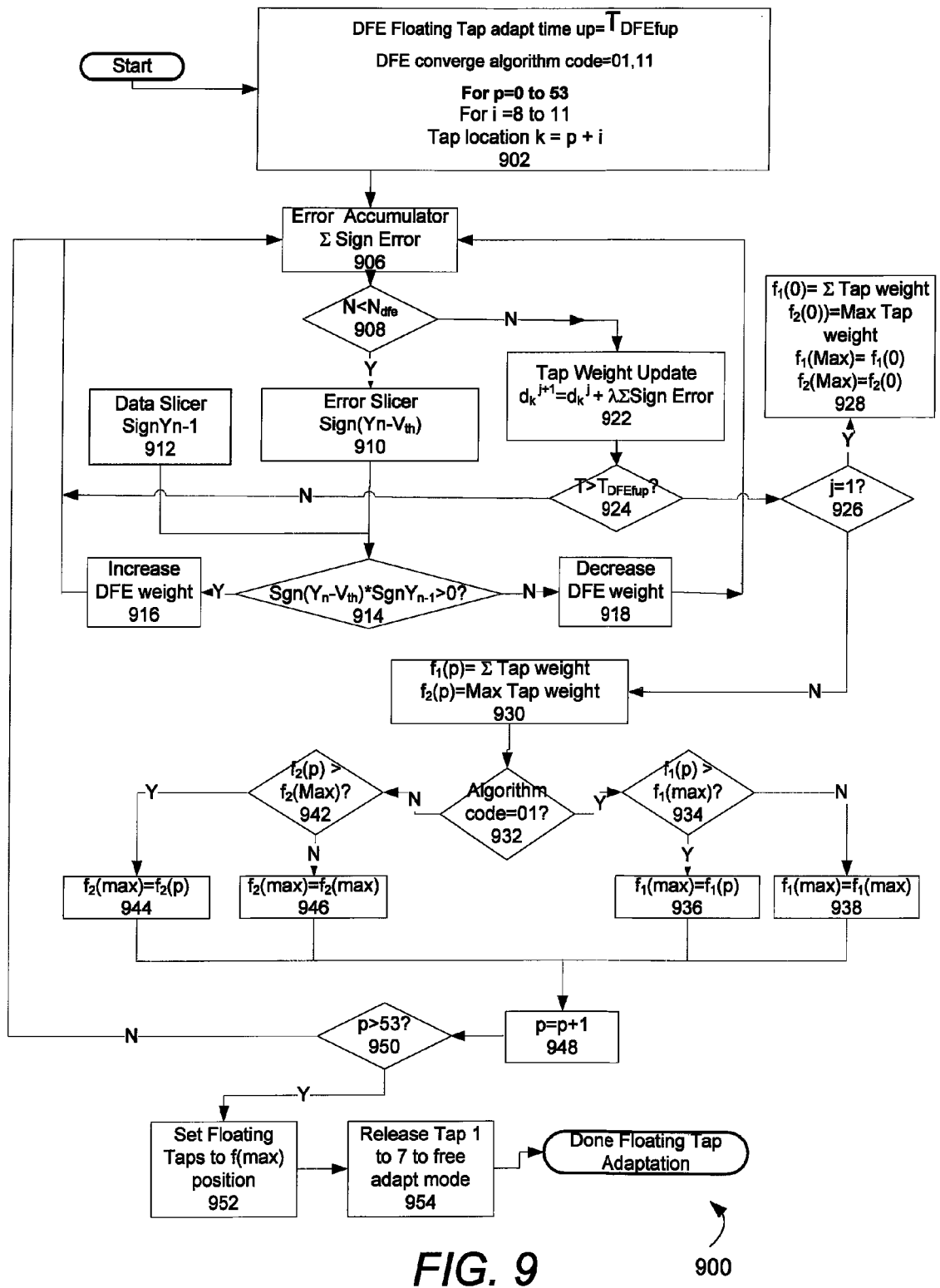
FIG. 9 is a flow chart of a method of DFE floating tap adaptation in accordance with an embodiment of the invention.

FIG. 9 is a flow chart of a method 900 of DFE floating tap adaptation in accordance with an embodiment of the invention. The method 900 includes a ZF LFS procedure and uses convergence detection which may be the same as or similar to that used for fixed tap adaption.

Per step 902, variables may be initialized. A DFE floating tap adaptation time up may be set to $T_{DFEfup}$. In addition, a DFE converge algorithm code may be set to one of multiple values, each value corresponding to a different convergence criterion. In one implementation, the algorithm code may be one of two values: 01 or 11. An instruction loop may then be performed where the floating tap position variable p goes from 0 to 53, and where the floating tap offset variable i goes from 8 to 11. The individual floating tap location may then be given by k=p+i.

Per step 906, error accumulation may be performed. The error accumulation may involve a summation of the signs of detected errors (Σ Sign Error). Per step 908, after a predetermined period of accumulation, a determination may be made as to whether the DFE update counter N is less than the error counter Ndfe.

If the DFE update counter N is less than the error counter Ndfe in step 908, then an error slicer may be applied to the difference Yn-Vth per step 910 to generate a sign signal Sign(Yn-Vth), where Yn is the data slicer output for the $n^{th}$ data, and Vth is the data amplitude reference or threshold voltage which is used to check the data amplitude. In addition, per step 912, the SignYn−1 signal may be obtained from the data slicer, where Yn−1 is the data slicer output for the $(n-1)^{th}$ data. Per step 914, these two sign values are multiplied, and a determination may be made as to whether the product is greater than zero. If Sign(Yn−Vth)*SignYn−1>0, then the DFE weight is increased per block 916; otherwise, the DFE weight is decreased per block 918. Thereafter, the method 900 loops back to step 906 where further error accumulation is performed.

On the other hand, if the DFE update counter N is larger than the error counter Ndfe in step 908, then the tap weight may be updated per step 922. In one implementation, the tap weight update may be in accordance with the equation $d_k^{j+1}=d_k^j+\lambda\Sigma \text{Sign Error}$, where $d_k^{j+1}$ is the weight of the $k^{th}$ tap at time j+1, $d_k^j$ is the weight of the le tap at time j, $\lambda$ is the tap incremental step, and $\Sigma$Sign Error is the accumulated sign error from step 906.

After the tap weight update per step 922, a determination may be made per step 924 as to whether the time-related variable T is greater than $T_{DFEfup}$. If so, then a further determination may be made as to whether p=0 (i.e. if this is the first location for the position variable p).

If p=0, then, per step 928, the current sum of tap weights $f_1(0)$ is set to be the summation of the floating tap weights for p=0, and the current maximum tap weight $f_2(0)$ is set to be the maximum of the floating tap weights for p=0. In addition, the highest sum $f_1$(Max) is set to $f_1(0)$, and the highest maximum $f_2$(Max) is set to $f_2(0)$.

Otherwise, if p does not equal to zero (i.e. if this is not the first location for the position variable p), then, per step 930, the current sum of tap weights $f_1(p)$ is set to be the summation of the floating tap weights for this value of p, and the current maximum tap weight $f_2(p)$ is set to be the maximum of the floating tap weights for this value of p. Thereafter, a determination may be made per step 932 as to the DFE converge algorithm code. In one implementation, if the algorithm code is set to a first value (for example, code 01), then a first convergence criterion may be utilized, and if the algorithm code is set to a second value (for example, code 11), then a second convergence criterion may be utilized.

In an exemplary implementation, the first convergence criterion may depend on the highest sum of the floating tap weights. In this case, the method 900 keeps track of the highest sum of the floating tap weights. Hence, per step 934, a determination may be made as to whether the current sum of tap weights $f_1(p)$ is greater than the most recently stored value of $f_1$(max). If $f_1(p)>f_1$(max), then $f_1$(max)=(p) (and the value of p corresponding to this highest sum is stored) per step 936; otherwise, $f_1$(max) remains unchanged per step 938. Thereafter, the method 900 may continue onto perform step 948.

The second convergence criterion may depend on the highest maximum floating tap weight. In this case, the method 900 keeps track of the highest maximum floating tap weight. Hence, per step 942, a determination may be made as to whether the current maximum tap weight $f_2(p)$ is greater than the most recently stored value of $f_2$(max). If $f_2(p)>f_2$(max), then $f_2$(max)=$f_2(p)$ (and the value of p corresponding to this highest maximum is stored) per step 944; otherwise, $f_2$(max) remains unchanged per step 946. Thereafter, the method 900 may continue onto perform step 948.

Per step 948, the position variable p may be incremented by one. Thereafter, per step 950, a determination may be made as to whether the position variable p has reached the top of its range. In one implementation, the top of the range is when p=53. If p is not above the top of its range, then the method 900 may go back to step 906 and perform error accumulation for this next grouping of floating taps.

Otherwise, if p is above the top of its range, then the method 900 may set the floating taps to the position corresponding to f(max) per step 952. In other words, if the first convergence criterion is used, then the floating taps are set to the position indicated by the stored p value corresponding to $f_1$(max), and if the second convergence criterion is used, then the floating taps are set to the position indicated by the stored p value corresponding to $f_2$(max).

Thereafter, per step 954, the fixed taps (for example, taps 1 to 7) that were previously frozen may be released such that they may be freely adapted. The floating tap adaptation method 900 is then done.

Figure 10A:
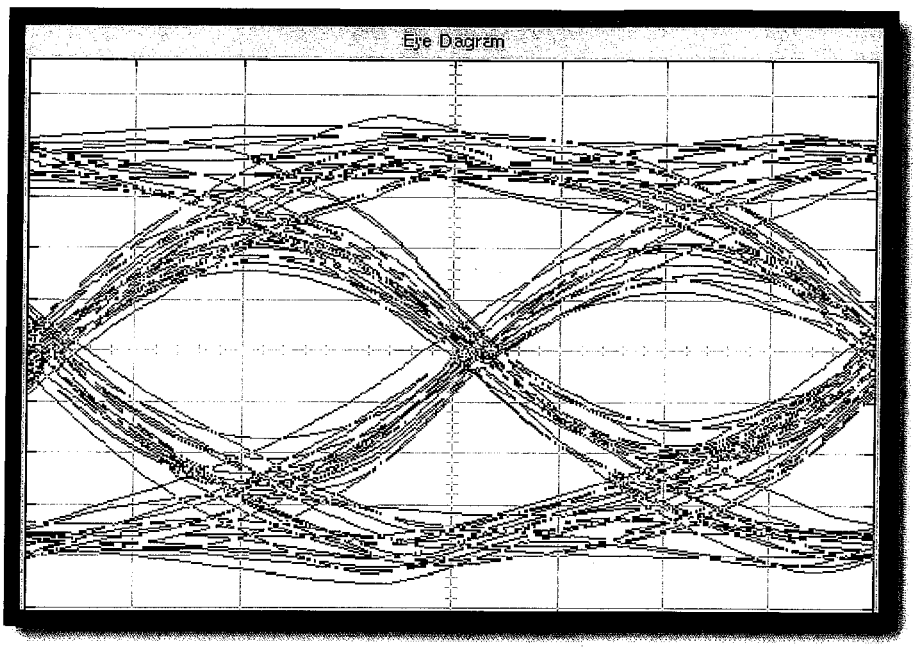
FIG. 10A is an eye diagram obtained with DFE adaptation using coarse resolution only in accordance with an embodiment of the invention.
Figure 10B:
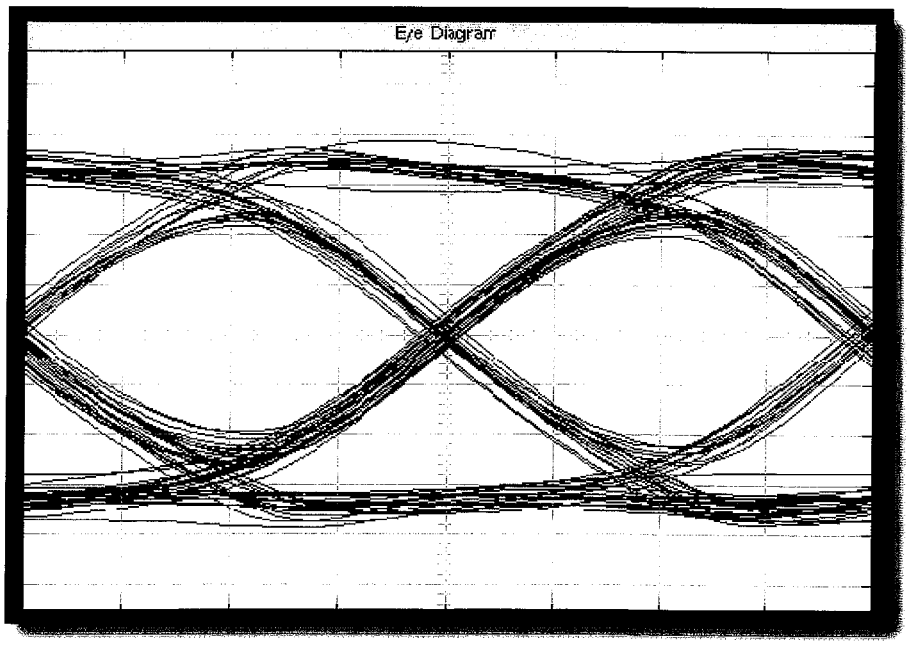
FIG. 10B is an eye diagram obtained with DFE adaptation using both coarse and fine resolution in accordance with an embodiment of the invention.

FIG. 10A is an eye diagram obtained with DFE adaptation using coarse resolution only in accordance with an embodiment of the invention. In comparison, FIG. 10B is an eye diagram obtained with DFE adaptation using both coarse and fine resolution in accordance with an embodiment of the invention. As shown, the eye opening is greater with the technique that uses both coarse and fine resolution.

Figure 11:
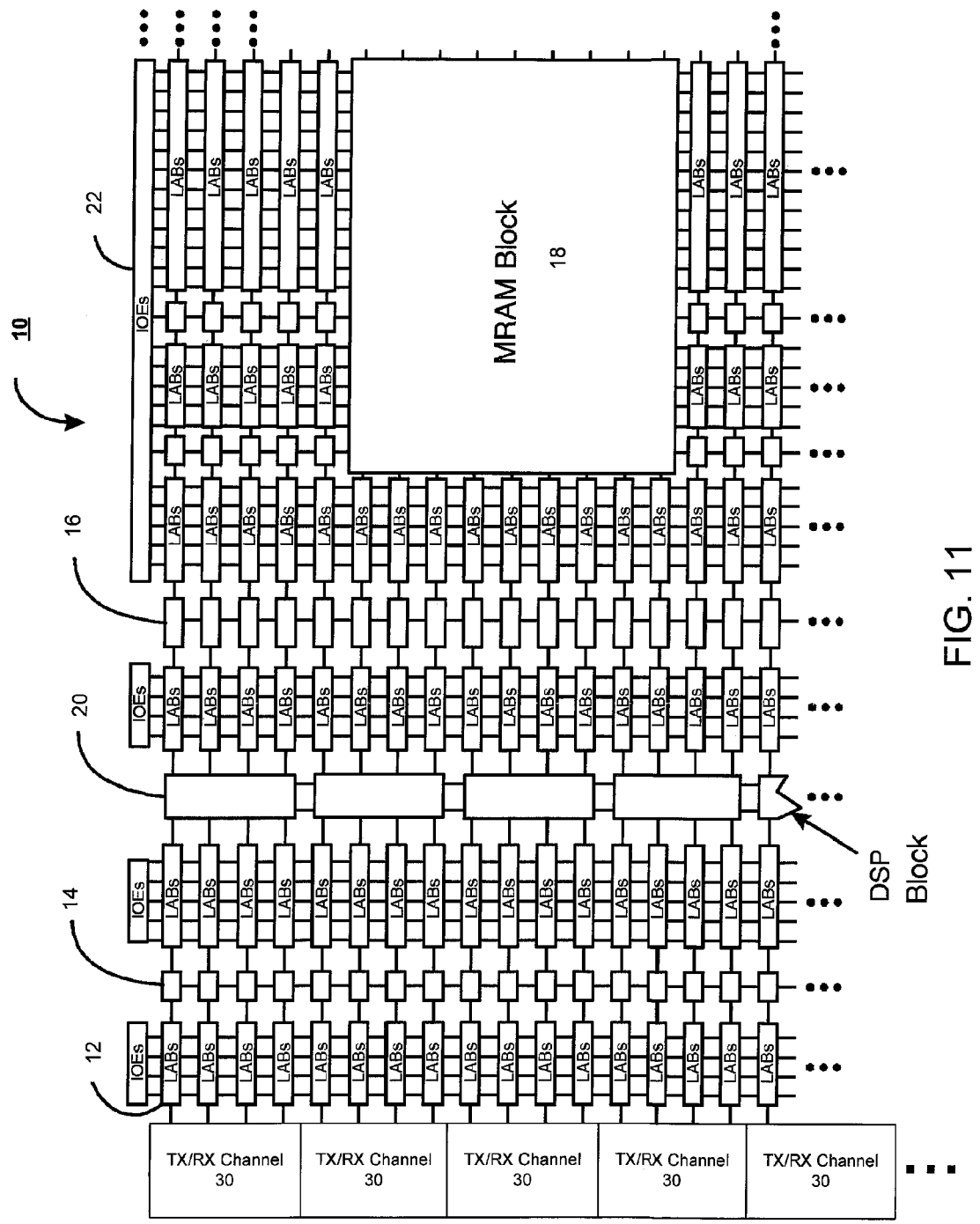
FIG. 11 is a simplified partial block diagram of a field programmable gate array (FPGA) that can include aspects of the present invention.

FIG. 11 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 12:
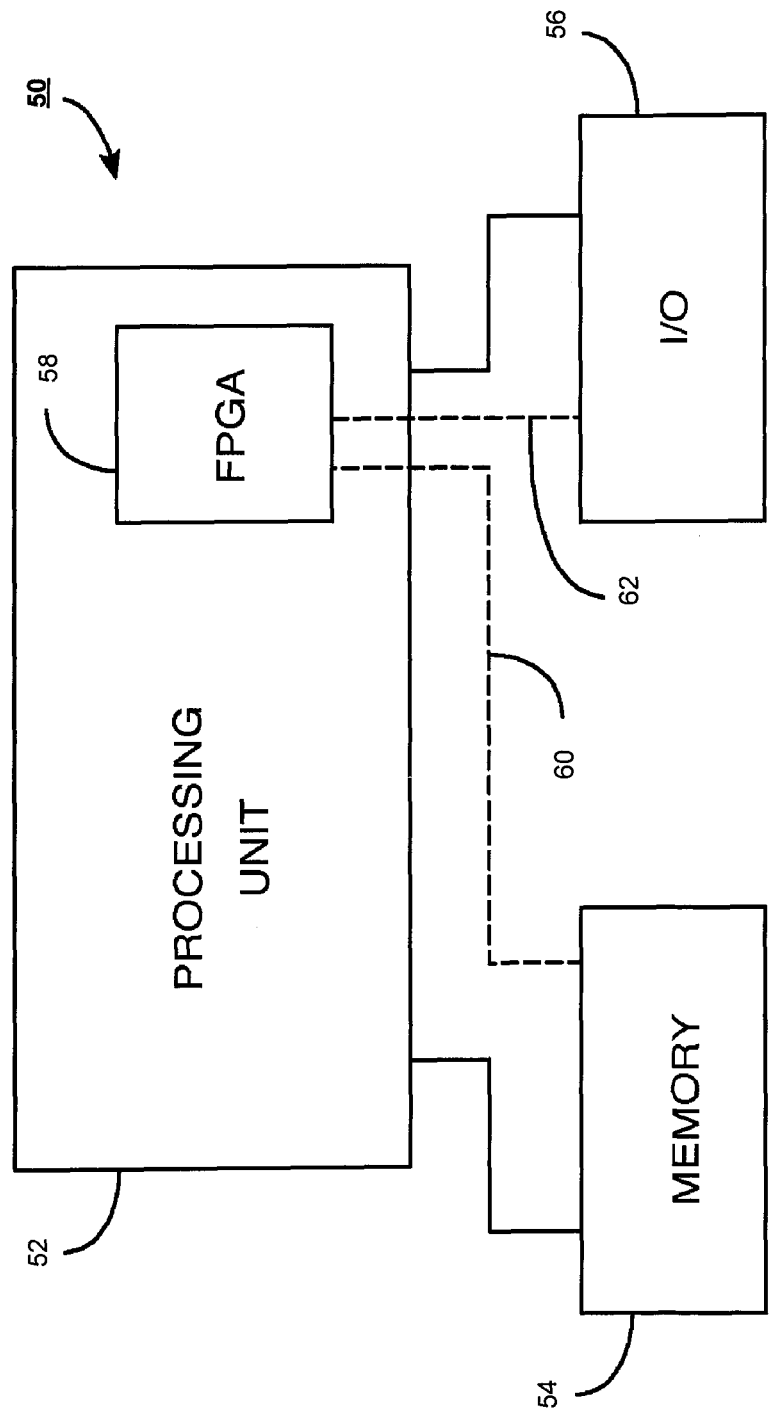
FIG. 12 shows a block diagram of an exemplary digital system 50 that includes an FPGA as one of several components and that may employ techniques of the present invention.

FIG. 12 shows a block diagram of an exemplary digital system 50 that includes an FPGA as one of several components and that may employ techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others.

Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A receiver circuit for a data link, the receiver circuit comprising:
   a linear equalizer for receiving an input data signal and outputting a linearly-equalized signal;
   a slicer circuit for receiving the linearly-equalized signal and outputting a quantized signal;
   a feedback filter having multiple taps for receiving the quantized signal and outputting a feedback signal;
   a summation node for adding the feedback signal to the linearly-equalized signal; and
   adaptation circuitry for adapting tap weights of the feedback filter with variable update resolution, wherein the adaptation circuitry operates in a coarse resolution mode followed by a fine resolution mode, wherein the fine resolution mode has a smaller step size than the coarse resolution mode for adapting the tap weights of the feedback filter, and wherein the adaptation circuitry uses a convergence detection criterion comprising a maximum step variation being greater than a threshold step variation to switch from the coarse resolution mode to the fine resolution mode.

2. The receiver circuit of claim 1, wherein the adaptation circuitry uses a zero-forcing least-mean-square procedure with the variable update resolution.

3. The receiver circuit of claim 1, wherein the feedback filter comprises fixed taps and floating taps.

4. A receiver circuit for a data link, the receiver circuit comprising:
   a linear equalizer for receiving an input data signal and outputting a linearly-equalized signal;
   a slicer circuit for receiving the linearly-equalized signal and outputting a quantized signal;
   a feedback filter having multiple taps for receiving the quantized signal and outputting a feedback signal, wherein the feedback filter comprises fixed and floating taps;
   a summation node for adding the feedback signal to the linearly-equalized signal; and
   adaptation circuitry for adapting tap weights of the fixed and floating taps of the feedback filter, wherein the floating taps comprise a group of multiple consecutive taps that has a start tap position and a length in taps, and wherein the adaptation circuitry sets the start tap position of the floating taps to be a position corresponding to a highest sum of tap weights.

5. The receiver of claim 4, wherein the adaptation circuitry freezes the fixed taps during adaptation of the floating taps.

6. A receiver circuit for a data link, the receiver circuit comprising:
   a linear equalizer for receiving an input data signal and outputting a linearly-equalized signal;
   a slicer circuit for receiving the linearly-equalized signal and outputting a quantized signal;
   a feedback filter having multiple taps for receiving the quantized signal and outputting a feedback signal, wherein the feedback filter comprises fixed and floating taps;
   a summation node for adding the feedback signal to the linearly-equalized signal; and
   adaptation circuitry for adapting tap weights of the fixed and floating taps of the feedback filter, wherein the floating taps comprise a group of multiple consecutive taps that has a start tap position and a length in taps, and wherein the adaptation circuitry sets the start tap position of the floating taps to be a position corresponding to a highest maximum tap weight.

7. A method of equalizing an input data signal using a feedback filter, the method comprising:
   equalizing the input data signal using a linear equalizer to generate a linearly-equalized signal;
   quantizing the linearly-equalized signal using a slicer to generate a quantized signal;
   filtering the quantized signal using the feedback filter to generate a feedback signal;
   adding the feedback signal to the linearly-equalized signal; and
   adapting tap weights of the feedback filter using adaptation circuitry with variable update resolution, wherein the adaptation circuitry operates in a coarse resolution mode followed by a fine resolution mode, wherein the fine resolution mode has a smaller step size than the coarse resolution mode for adapting the tap weights of the feedback filter, and wherein the adaptation circuitry uses a convergence detection criterion comprising a maximum step variation being greater than a threshold step variation to switch from the coarse resolution mode to the fine resolution mode.

8. The method of claim 7, wherein the feedback filter comprises fixed taps and floating taps.

9. A method of equalizing an input data signal using a feedback filter, the method comprising:

equalizing the input data signal using a linear equalizer to generate a linearly-equalized signal;

quantizing the linearly-equalized signal using a slicer to generate a quantized signal;

filtering the quantized signal using the feedback filter having fixed and floating taps to generate a feedback signal;

adding the feedback signal to the linearly-equalized signal; and adapting tap weights of the fixed and floating taps of the feedback filter using adaptation circuitry, wherein the floating taps comprise a group of multiple consecutive taps that has a start tap position and a length in taps, and wherein the adaptation circuitry sets the start tap position of the floating taps to be a position corresponding to a highest sum of tap weights.

10. The method of claim 9, wherein the adaptation circuitry freezes the fixed taps during adaptation of the floating taps.

11. A method of equalizing an input data signal using a feedback filter, the method comprising:

equalizing the input data signal using a linear equalizer to generate a linearly-equalized signal;

quantizing the linearly-equalized signal using a slicer to generate a quantized signal;

filtering the quantized signal using the feedback filter having fixed and floating taps to generate a feedback signal;

adding the feedback signal to the linearly-equalized signal; and adapting tap weights of the fixed and floating taps of the feedback filter using adaptation circuitry, wherein the floating taps comprise a group of multiple consecutive taps that has a start tap position and a length in taps, and wherein the adaptation circuitry sets the start tap position of the floating taps to be a position corresponding to a highest maximum tap weight.

* * * * *